April 1, 1958     H. M. McDONALD     2,829,187
DEFERRED-ACTION BATTERY
Filed Dec. 5, 1955
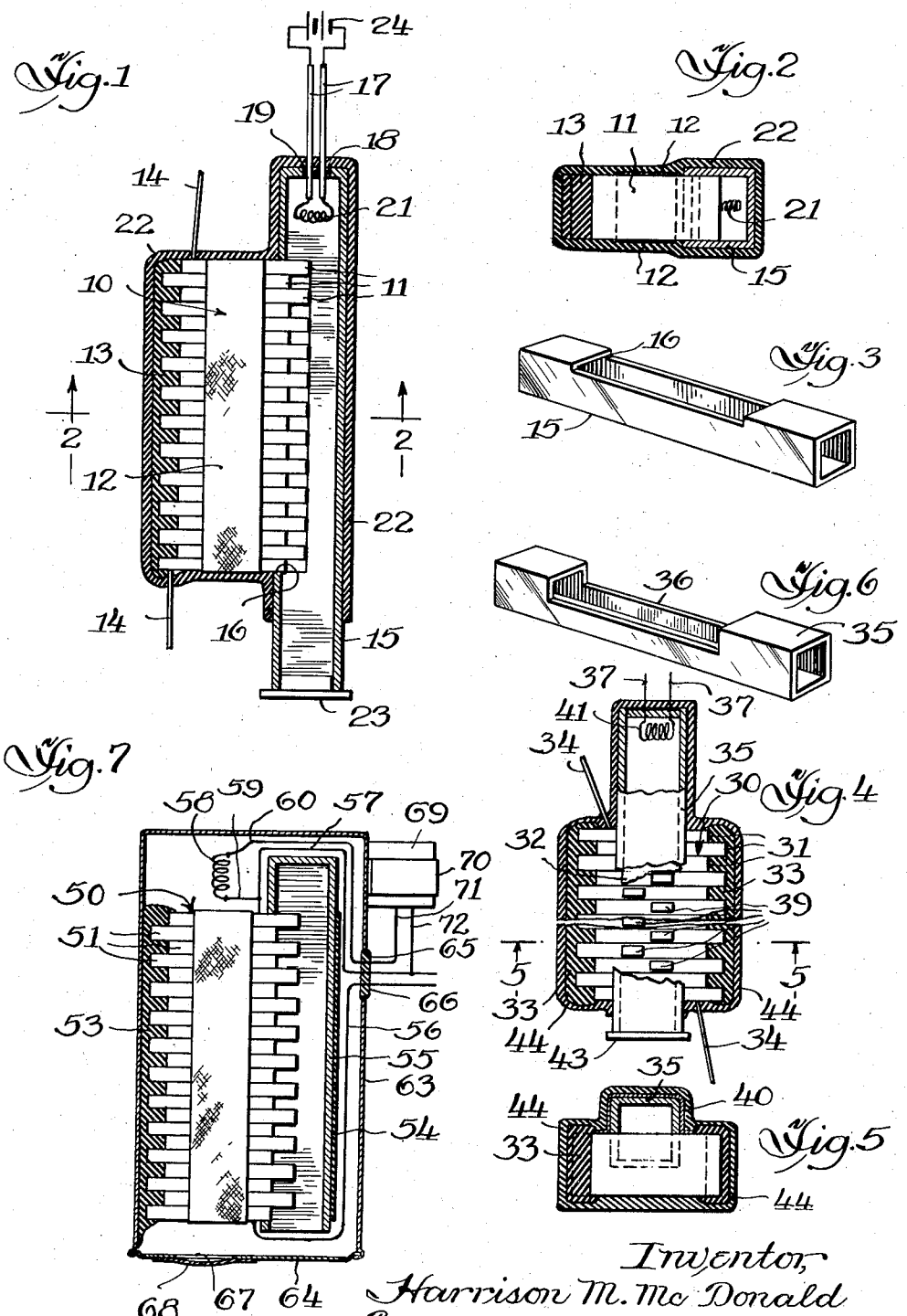
Inventor,
Harrison M. McDonald
By Jones, Jesch & Darbo,
Attys.

United States Patent Office 2,829,187
Patented Apr. 1, 1958

2,829,187

DEFERRED-ACTION BATTERY

Harrison M. McDonald, Freeport, Ill., assignor to Burgess Battery Company, Freeport, Ill., a corporation of Delaware Application December 5, 1955, Serial No. 550,963

5 Claims. (Cl. 136—90)

The invention relates to deferred-action electric batteries and particularly to an improved deferred-action battery having means for providing quick activation upon being brought in contact with the activating liquid. As another aspect of the invention, it relates to a deferred-action battery which is adapted for activation by being brought in contact with a body of activating liquid, as by being immersed in such a body, and includes the provision of means for inhibiting short circuits between cells after the battery has been activated.

It is an object of the invention to provide a deferred-action battery which, upon being brought into contact with the activating liquid, is quickly activated and brought up to full energy-delivering capacity. It is another object to provide a deferred-action battery in which short circuits between cells are substantially avoided.

Briefly, the first mentioned object is accomplished by providing a space in communication with the interiors of the cells, and means operative upon initiating the activating operation for evacuating the space, including the interiors of the cells, and then permitting access of activating liquid to the evacuated space, whereby the activating liquid is drawn rapidly into the space and the cells to activate the battery.

With respect to the second object, this is attained by the provision of a confined space of restricted size adjacent to and in communication with the interiors of the cells. Such restricted space results in a low short-circuit conductivity between cells through the activating liquid. As a second result, the gases generated during operation of the battery fill the confined space to the exclusion of the activating liquid within which the battery is immersed, which liquid would otherwise cause short circuits.

Other objects and advantages will become apparent as the following description progresses.

In the drawings:

Fig. 1 is a longitudinal sectional view of an embodiment of a deferred-action battery in accordance with the invention;

Fig. 2 is a transverse sectional view along line 2—2 of Fig. 1;

Fig. 3 is a perspective view of the tubular element of the embodiment of Fig. 1 which provides the confined space mentioned in the foregoing;

Fig. 4 is a top view of a different embodiment of the invention with a portion of the tubular element removed;

Fig. 5 is a transverse sectional view along line 5—5 of Fig. 4;

Fig. 6 is a perspective view of the tubular element of the embodiment of Figs. 4 and 5, and Fig. 7 is a longitudinal sectional view of a different embodiment of the battery of the invention.

In the embodiment of Figs. 1 to 3, the battery 10 is similar to that disclosed in U. S. Patent No. 2,637,756 and consists of a plurality of flat cells 11 which are individually of rectangular wafer shape, and are stacked together and electrically connected in series. Each cell is composed of thin sheet-form elements including an anode, a cathode and a porous, absorbent, electrolyte-receptive element between said electrodes, whereby after activation of the battery, the electrolyte-respective element is impregnated with electrolyte and the broad surfaces of the electrodes are exposed to such electrolyte. The details of the cells and battery will not be described herein, reference being made to U. S. Patent No. 2,637,756 for such details. Each cell is enclosed by an insulating covering on its lateral surfaces and is open at its ends. The cells are connected together in series through small openings in the insulating coverings. Each succeeding cell is offset lengthwise thereof in the opposite direction with respect to the last, so that a staggered succession of cells is formed and the open end of each cell is spaced a substantial distance from that of the adjacent cell. The adhesive tape 12 encircles the stack longitudinally and holds the cells in stacked relation under compression. Terminal conductors 14 are connected, respectively, to the end cells of the battery. A mass of non-conductive sealing material 13 is applied in the molten condition to a side of the battery containing the open ends of the cells 11. An example of a suitable material for this purpose is the well-known epoxy resin of the thermosetting type adapted for encapsulating electrical elements. The material 13 flows into the recesses between the projecting cell ends and makes contact with and seals the open ends of all of the cells of the battery. The material 13 cools and solidifies and forms a layer as shown in Fig. 1 covering one entire side of the battery.

A tubular member 15 having an elongated opening 16 in one side thereof is fitted tightly down upon the side of the battery opposite the side having the sealing material 13. Tubular member 15 is preferably composed of a non-conductive material such as hard fiber, synthetic resin, or the like. It is rectangular in cross section and its internal width is equal to the external width of battery 10. The side opening 16 is formed by removing one side wall of the tubular member for a distance equal to the length of the battery, whereby when the tubular member is placed upon the battery the side walls of member 15 and the end edges of opening 16 fit snugly against the side and end walls, respectively, of the battery. The tubular member 15 is pushed down upon the side of the battery for a sufficient distance that the side walls of the member overlap the edges of the non-projecting cells 11, as is shown in Fig. 1, whereby the open ends of such cells are exposed to the interior of the tubular member only and not to the surrounding space. The tubular member 15 extends above the battery 10 a substantial distance for a reason which will be explained hereinafter, and is closed at its upper end. An opening 18 is provided in said closed end and a pair of conductors 17 pass through said opening, the space surrounding the conductors being sealed by flowing into it a molten composition 19 such as the epoxy resin described in the foregoing. The composition cools and solidifies in the opening. Within the closed end portion of tubular member 15 and connected to conductors 17 is the heating coil 21, the purpose of which will be described hereinafter.

The lower end of tubular member 15 extends slightly below battery 10. Said end is open and is subsequently closed by a rupturable member as will be described hereinafter. The entire assembly which has been described is given a sealing covering 22, which may be formed by dipping it in a bath of a molten composition such as microcrystalline wax, polyethylene, epoxy resin, or the like. The dipping operation is carried out in such manner that the open end of tubular member 15 is not submerged, whereby the coating 22 does not enter said end of the member 15, as shown, in Fig. 1.

After the battery has been formed as described, the interiors of tubular member 15 and of the cells 11 are evacuated by a suitable evacuating means such as an air pump. A rapidly combustible mixture such as a combustible mixture of gases is then introduced into the evacuated interiors of tubular member 15 and cells 11. Examples of such substances are mixtures with oxygen or hydrogen, sulfur dioxide, ethane, methane, and the like. Thereafter the open end of tubular member 15 is closed by means of a rupturable gas-impervious member or diaphragm 23 composed of glass, lead foil, aluminum foil, or the like. Said diaphragm is joined to the end of member 15 in gas-tight relation by means of a suitable adhesive sealing composition such as microcrystalline wax, asphalt, or the like. The covering 22 forms a gas-tight sealing enclosure for the assembled battery 10 and tubular member 15, such that with the diaphragm closure 23 in position the interiors of the tubular member and the cells and the combustible gaseous mixture contained therein are effectively sealed from the surrounding atmosphere. The covering 22 also provides a mechanical strengthening and reinforcing of the assembly and a strong union between battery 10 and tubular member 15. The conductors 14 and 17 project through said covering 22, and the latter makes adhesive sealing juncture with said conductors.

To place the battery 10 in operation, it is brought into contact with a body of activating liquid by submerging the assembly which has been described in said body, or submerging at least the end of tubular member 15 which is closed by diaphragm 23. The battery of the invention is intended especially for use at sea upon the ocean or fresh water lakes, etc., and in practice is usually supported by floating apparatus (not shown) with the bottom portion submerged. It is adapted for activation by contact with or immersion in fresh water, the salt water of the ocean, or a dilute aqueous solution of sodium chloride, such as a solution containing 5 percent NaCl, based on the weight of the solution. Patent 2,637,756 discloses a battery which is adapted to be so activated. After contact of the battery with the body of activating liquid as described, the conductors 17 are connected to a suitable source of electrical energy, such as the battery illustrated diagrammatically at 24, and heating coil 21 is heated to the ignition point of the gaseous mixture in tubular member 15. Combustion occurs rapidly with the formation of considerable heat. The first effect is an expansion of the gases, which causes rupture of diaphragm 23 and expulsion of the hot gases from the tubular member 15. The second effect is a cooling and contraction of the gases with resulting partial evacuation of the interior of tubular member 15 and the interiors of the cells 11. Where a mixture of gases is used which is converted by combustion into a liquid or solid, such change of state contributes to the contraction effect. An example of a mixture which undergoes a change of state is hydrogen and oxygen, which is converted to water. Since the interiors of the cells are in free communication with the interior of tubular member 15, there is also a partial evacuation of the interiors of the cells. The condition of evacuation results in a rapid in-drawing of the activating liquid into the tubular member 15 and the interiors of the cells. The tubular member 15 extends to a point above the battery 10 in order to insure that upon partial evacuation activating liquid will be drawn into all of the cells including the topmost cell of the battery.

The activating action which has been described takes place with great rapidity and thoroughness. The liquid enters the cells more quickly and permeates their interiors more effectively and thoroughly than it would if tubular member 15 and the means for evacuating it were not provided and battery 10 were simply immersed in the activating liquid. As a result, the energy-producing components of the cells are utilized to the fullest extent.

After the gaseous mixture in tubular member 15 is ignited the conductors 17 are disconnected from the source of energy 24. Either before or after the battery is activated, the terminal conductors 14 are connected to the load circuit of the battery.

The battery of the invention, in addition to exhibiting the advantage of quick activation, provides the additional advantage that short circuits between cells are inhibited. When the tubular member 15 is filled with activating liquid as a result of the action which has been described, such liquid, being conductive, provides a path for the flow of current between the electrodes which are exposed to it. For example, short-circuiting current can flow between the anode of one cell and the anode of every other cell of the battery. The voltage gradient between cells which are remote from each other is greater than that between cells which are in proximity to each other, and the high gradient between remote cells creates a much greater tendency for short-circuit current to flow. Tubular member 15 restricts severely the area of such flow transversely of its direction, and the result is low conductivity or high resistance to such flow. If member 15 is absent and battery 10 is immersed in a body of activating liquid of substantial volume the effective resistance is low and a large short-circuiting current flows. As an example, where member 15 is absent the effective resistance between end cells has in some cases been found to be no more than the effective resistance between similar electrodes of adjacent cells. With the tubular member 15 present, however, the effective resistance between cells is of the order of the sum of the effective resistances between adjacent cells.

The size of the tubular member relative to the size of the battery may be varied. The tubular member should provide adequate rapid inflow of activating liquid and at the same time inhibit short circuits in the manner which has been described. An effective internal cross sectional area of approximately 5 percent to 20 percent of the area of an electrode of a cell 11 which is exposed to the electrolyte of the cell has been found to produce satisfactory results. The effective area is the area at the location where the interior of the tubular member is most constricted, which, in the embodiment of Figs. 1 to 3, is the area at the locations of the cells 11 which project into the tubular member.

The structure which has been described provides another means for inhibiting short circuits. During operation of the battery 10, gas is generated in the cells 11 and this gas is discharged into the tubular member 15 from the open ends of the cells. Any deferred-action battery of the type which generates gas during discharge is suitable for the purpose of the invention and will cause expulsion of activating liquid from tubular member 15. An example of such a battery is that described in Patent No. 2,637,756 in which the anodes of the cells are of a metal such as magnesium or zinc, the depolarizing cathode is cuprous chloride and the electrolyte is a dilute aqueous solution of a salt such as sodium chloride, and which may be the salt water of the ocean. As stated heretofore, the activating liquid may be ordinary water. The discharging gas fills the interior of member 15 and expels activating liquid therefrom. It does not expel activating liquid from the interiors of the cells because each cell is provided with a porous absorbent separator between the electrodes thereof, as is described in Patent 2,637,746, and such absorbent material retains activating liquid. The cells, therefore, remain in operative condition. The discharging gases possess the power of expelling activating liquid from tubular member 15 even when the battery is submerged in a body of activating liquid. After the liquid has been expelled, loss of energy because of short-cricuiting current between cells is substantially avoided.

A second embodiment of the battery is illustrated in Figs. 4, 5 and 6, the tubular member in such embodiment being in communication with the sides of the cells, instead of the ends of the cells as in the embodiment of Figs. 1, 2 and 3. In this second embodiment, the battery 30 is similar to the battery 10 of the embodiment of Figs. 1, 2 and 3, and the open ends of the cells 31 at both sides of the battery are closed by masses of sealing composition 33 similar to composition 13 of the embodiment of Figs. 1 to 3. In this embodiment the cells do not need to be staggered as shown, but may be in alignment. Terminal conductors 34 are connected, respectively, to the end cells at opposite ends of the battery. A tubular member 35, generally similar to the member 15 of the embodiment of Figs. 1 to 3, is fitted over a side of the battery other than a side closed by sealing composition 33, the tubular member extending longitudinally of the battery and being disposed substantially centrally of the side of the battery. It may be disposed eccentrically of the battery, but should be so disposed that the ends of all of the cells extend beyond the side walls of the tubular member on both sides of the latter.

As stated heretofore, the tubular member 35 is generally similar to the member 15. There is the difference that at the opening 36 in the side of the member, the side walls are cut down lower, as shown in Fig. 6, so that the member fits down a substantial distance on the battery 30. At the edge of each cell 31 an opening 39 is provided in the insulating covering of the cell, which openings also extend through tape 32 which encircles the stack of cells, said openings 39 providing local areas of communication between the interior of each cell and the interior of tubular member 35. Openings 39 are of rectangular shape, but they may be of any other shape, such as round, oval, etc., if desired. The opening of each cell is offset lengthwise of the cell with respect to that of the adjacent cell, whereby a staggered succession of openings is provided. This results in a greater spacing between adjacent openings than would be provided if the openings were in alignment. Such greater spacing of the openings results in reduced tendency towards short circuits between cells during operation of the battery.

The tubular member 35 fits snugly upon the battery 30 and is held in position by adhesive tape 40 which is applied to the member 35 and the adjacent surface of battery 30 on both sides of the member 35. The upper end portion of member 35 is closed and a pair of electrical conductors 37 pass through the end wall of said member and are connected to the heating coil 41 located within said closed end portion. The lower end of member 35 is closed by the rupturable diaphragm 43, and the assembly, except for the lower end portion of tubular member 35 is encased in a sealing and reinforcing covering 44 in the same manner as described in connection with the embodiment of Figs. 1 to 3. Also, the internal transverse sectional area of tubular member 35 is restricted in the same manner as described in connection with the tubular member 15 of the embodiment of Figs. 1 to 3.

After the assembly has been made as described and before rupturable diaphragm 43 has been applied to the open end of tubular member 35, said tubular member and the interiors of the cells of the battery are evacuated, and said interiors are filled with a combustible gaseous mixture, such as has been described hereinbefore. The rupturable diaphragm 43 is then applied to the end of member 35 and the gaseous mixture thereby sealed in tubular member 35 and interiors of the cells.

The activation and operation of the battery are carried out in the manner which has been described heretofore in connection with the embodiment of Figs. 1 to 3. Rapid activation takes place, and short-circuiting current is inhibited while tubular member 35 is filled with activating liquid. After the battery is in operation gases are generated and expel activating liquid from tubular member 35 and keep it out of said member as long as the battery is in operation, thereby inhibiting short circuits between cells.

In the embodiment shown in Fig. 7, a battery and tubular member assembly, generally similar to that described in connection with Figs. 1 to 3, is contained in a separate outer container. The battery 50 is similar to the battery 10 of the embodiment of Figs. 1 to 3, and one side thereof, containing the open ends of the cells 51, has a mass of thermoplastic sealing composition 53 such as microcrystalline wax, asphalt, or the like, applied thereto and providing a seal closure for the open ends of the cells. Over the side of the battery opposite sealing composition 53 is located the tubular member 55 which fits down over the side of the battery in such manner as to enclose the open ends of the cells 51 whereby the interiors of the cells are in communication with the interior of tubular member 55 only and not with the space outside said member. The opening in the side of the member 55 is of a size such that said member fits snugly upon battery 50, and an adhesive tape 54 is applied to tubular member 55 and the adjacent surfaces of battery 50 to adhesively join the two together and seal the joints between them, in the same manner as tape 40 joins tubular member 35 to battery 30 in the embodiment of Figs. 4 to 6. Battery terminal conductors 56 and 57 are connected to the end cells of battery 50. A heating coil 58 is disposed at one end of the battery and outside of tubular member 55, said coil having terminal conductors 59 and 60 connected thereto. Terminal conductor 59 is connected to battery terminal conductor 57 as shown.

The assembly comprising battery 50, tubular member 55, heating coil 58 and the terminal conductors therefor is inserted in an outer container 63 which is composed of a suitable material such as metal. Container 63 is of rectangular shape, generally in conformance with the shape of the assembly of battery 50 and tubular member 55, and is of a size to leave space surrounding said assembly on all but one side, as will be described. At the time of insertion, container 63 is open at the bottom end thereof, which end is subsequently closed by cover 64. The battery 50 is inserted with the sealing composition 53 against one side of the container 63, and this side of the container is heated sufficiently to soften the thermoplastic material 53 and cause the latter to adhere firmly to the container. Container 63 has an opening in the wall thereof opposite the wall to which battery 50 is attached, and conductors 56, 57 and 60 are led through said opening whereby they extend to the exterior of container 63. The opening 65 is then sealed by flowing into it surrounding the conductors a sealing composition 66 such as asphalt, epoxy resin, or the like.

After the assembly of battery 50, tubular member 55 and heating coil 58 have been inserted in container 63 as described, cover 64 is placed upon the open end of the container and the metal of the cover crimped to the edge of the container as shown in Fig. 7, or otherwise suitably joined to the container in a manner such as to form a gas-tight joint. Cover 64 has an opening 67 therein. After the cover is joined to container 63, the air in the interiors of the container 63, tubular member 55 and the cells 51 is evacuated through opening 67 by suitable evacuating means, said interiors are then filled with a combustible gaseous mixture, such as has been described hereinbefore, and opening 67 is then closed with a covering or diaphragm 68 of rupturable material, such as lead foil, aluminum foil, glass, or the like, which diaphragm is adhesively joined to the cover around the periphery of opening 67 by means of a suitable adhesive composition.

An expendable deferred-action battery 69 is mounted exteriorly at the side of container 63 and suitably attached thereto as by the adhesive tape 70, and the terminal conductors 71 and 72 of said battery are connected respectively to terminals 57 and 60, whereby said battery is connected in energizing relation to heating coil 58. Battery 69 is adapted to be activated by the same activating liquid which is used to activate battery 50 and is of the type adapted to deliver large output current at relatively low voltage. An example of a battery suitable for the purpose is that described in United States Patent No. 2,428,850, and particularly that described in connection with Figs. 3 and 4 of said patent. Such a battery is very rapidly activated upon contact with activating liquid.

When it is desired to activate battery 50, the entire assembly is immersed in a body of activating liquid. This construction is especially adapted for use with sonobuoy apparatus (not shown) which is dropped into the sea from an airplane or ship and in which the battery assembly is immersed in the water. As a result of the immersion, battery 69 is quickly activated and energizes heating coil 58 which thereupon ignites and causes combustion of the gaseous mixture in container 63. As a result of such combustion and the ensuing expansion of gases followed by condensation thereof, as has been described hereinbefore, rupturable sheet 68 is ruptured, the interiors of container 63, tubular member 55 and cells 51 are partially evacuated, and activating liquid is drawn into said interiors at a rapid rate, whereby battery 50 is quickly activated. As has been explained heretofore in connection with the embodiment of Figs. 1 to 3, the evacuation of the interiors of the cells caused by combustion of the gaseous mixture results in a thorough absorption of activating liquid into the interiors of the cells, whereby their energy-producing elements are utilized more completely. As has also been explained in connection with the other embodiments, the tubular member 55 inhibits short-circuiting current between cells while the member is filled with activating liquid and after battery 69 is in operation the gases generated thereby expel activating liquid from the tubular member and prevent entrance of liquid thereinto, whereby short circuits between cells are inhibited.

Battery 69 is constructed to possess capacity such that after coil 58 has been heated and the gaseous mixture in container 63 has been ignited, said battery is expended and the energy-producing elements thereof are consumed.

The deferred-action battery of Fig. 7 is entirely automatic in operation, that is, upon immersion in the body of activating liquid, rapid activation ensues automatically and separate steps to cause energization of the heating coil 58 are not required. An activating battery such as battery 69 may be provided for the embodiments of Figs. 1 to 6.

While but three specific embodiments of the deferred-action battery of the invention have been described, this is by way of illustration and variations may be made therein within the spirit of the invention as will occur to those skilled in the art. As an example of such a variation, the tubular member need not be rectangular in cross section but may be of other shape, as circular, oval, etc. As another example, the shape of container 63 of the embodiment of Fig. 7 may be other than rectangular, as cylindrical, etc. As another example, combustible compositions other than a gaseous mixture may be used, such as mixtures with oxygen of solid substances such as shredded aluminum foil, shredded magnesium, cotton, etc. In such case the solid substance is located so that the heating coil is in contact with it, and the interior of the container 63 of Fig. 7, or the interior of the tubular member in the embodiments of Figs. 1 to 6, is initially evacuated and then gaseous oxygen is introduced therein, after which the rupturable diaphragm is applied. In the embodiment of Fig. 7, a portion of the solid substance and also a heating coil (as illustrated in Fig. 1) may be located in tubular member 55 and another portion of the solid substance and a second heating coil (as illustrated in Fig. 7) may be located in casing 63 outside of tubular member 55. The combustion is supported by the oxygen, and activation and operation takes place in the manner which has been described herein.

Invention is claimed as follows:

1. A quick activating deferred-action battery structure for activation in contact with a body of activating liquid, comprising a deferred-action battery comprising a plurality of cells, a gas-tight sealing enclosure for said battery, a hollow tubular member extending along a side of said battery, the interiors of said cells being in communication with the interior of said tubular member, the wall of said tubular member having a rupturable portion, rapidly combustible mixture in said tubular member, said mixture, upon reaction, causing gas pressure followed by evacuation in the interior of said tubular member, means for initiating reaction of said mixture whereby said rupturable portion is ruptured, the interiors of said cells and said tubular member are evacuated, and activating liquid is drawn into said tubular member and said cells.

2. A quick activating battery structure as claimed in claim 1 in which the rupturable portion and the means for initiating the reaction are located at opposite end portions of the tubular member, respectively.

3. A quick activating deferred-action battery structure for activation in contact with a body of activating liquid, comprising a deferred-action battery comprising a plurality of cells, a gas-tight sealing enclosure for said battery, a hollow tubular member extending along a side of said battery, the interiors of said cells being in communication with the interior of said tubular member, a container enclosing said battery and said tubular member, the interior of said tubular member being locally in communication with the interior of said container, a rapidly combustible mixture in at least one of said container and said tubular member, said substance, upon reaction, causing evacuation of the interiors of said container, said tubular member and said cells, means for initiating reaction of said mixture, and means for providing communication between the evacuated interior of said container and a body of activating liquid in contact with said container, whereby upon reaction of said mixture and evacuation of said interiors of said container, tubular member and cells, activating liquid is drawn into said interiors.

4. A battery structure as claimed in claim 3 in which the interior of the tubular member is in communication with the interior of the container at an end portion of the tubular member.

5. A battery structure as claimed in claim 3 in which the means for providing communication between the evacuated interior of the container and a body of activating liquid is a rupturable portion of the wall of said container, which portion is ruptured upon reaction of said rapidly combustible mixture.

References Cited in the file of this patent

UNITED STATES PATENTS

| | | |
|---|---|---|
| 2,452,049 | Hauck | Oct. 26, 1948 |
| 2,564,495 | Mullen | Aug. 14, 1951 |
| 2,594,879 | Davis | Apr. 29, 1952 |
| 2,636,061 | Baldwin | Apr. 21, 1953 |
| 2,637,757 | Wilke | May 5, 1953 |
| 2,699,461 | Wilke | Jan. 11, 1955 |

OTHER REFERENCES

Bailar, J. C., Jr.: "Essentials of General Chemistry," D. C. Heath & Company, Boston (1946), pp. 53, 225 and 503. (Personal copy in Div. 56.)